United States Patent [19]
Jang et al.

[11] Patent Number: 5,457,646
[45] Date of Patent: Oct. 10, 1995

[54] PARTIAL CARRY-SAVE PIPELINE MULTIPLIER

[75] Inventors: Yi-Feng Jang, Keelung; Ching-Hsiang Yang, Chia-Li; Po-Chuan Huang, Hsinchu, all of Taiwan

[73] Assignee: Industrial Technology Research Institute, Hsinchu, Taiwan

[21] Appl. No.: 134,068

[22] Filed: Oct. 12, 1993

[51] Int. Cl.$^6$ ...................................................... G06F 7/52
[52] U.S. Cl. .......................................... 364/757; 364/758
[58] Field of Search ........................... 364/754, 757–760, 364/768, 784, 786

[56] References Cited

U.S. PATENT DOCUMENTS

| | | | |
|---|---|---|---|
| 4,644,488 | 2/1987 | Nathan | 364/724 |
| 4,982,355 | 1/1991 | Nishimura et al. | 364/758 |
| 5,101,372 | 3/1992 | Heaslip | 364/758 |
| 5,151,875 | 9/1992 | Sato | 364/784 |

*Primary Examiner*—Roy N. Envall, Jr.
*Assistant Examiner*—Emmanuel L. Moise
*Attorney, Agent, or Firm*—Bo-In Lin

[57] ABSTRACT

A pipeline multiplier is used for multiplying a multiplicand to a multiplier. The pipeline multiplier includes a plurality of adder stages each adder stage includes a partial product processor for processing a partial product of the multiplicand and one of the multiplier. Each of the adder stages further includes a plurality of ripple carry adder (RCA) bands each band includes a plurality of full adders wherein the carry of the full adders ripple sequentially to the most significant full adder in the RCA band. Furthermore, each of the RCA bands in each adder stage includes approximately same number of full adders. The adder stages are further arranged in sequential order such that each of the RCA bands in each stage are pipelined to a corresponding RCA band, which is a RCA band being more-significantly-shifted by one bit, in next adder stage according to the sequential order whereby an accumulative partial product is propagated from one of the adder stages to a next stage. The full adders in each of the RCA band add the partial product from the partial product processing means to the accumulative partial product propagated from last adder stage according to the sequential order. Each of the adder stages further includes a half adder for adding the carry from the RCA band to a bit of the partial product which is the least significant bit of a next more significant RCA band in the adder stage for propagating a processed band-carry to the corresponding RCA band in the next adder stage as the most significant bit of the partial product and to a more significant RCA band in the next adder stage as a carry-in.

7 Claims, 4 Drawing Sheets

PARTIAL CARRY-SAVE PIPELINE MULTIPLIER

BACKGROUND OF THE INVENTION

1. Field of the Invention

This invention relates generally to a pipeline multiplier. More particularly, this invention relates to a high speed pipeline multiplier which implements the partial carry save technique.

2. Description of the Prior Art

As the task of carrying out multiplication by the use of electronic circuits is a very time consuming complex operation, two of most common objects in the design of a multiplication circuit are to achieve high speed performance and to reduce circuit complexity whereby it occupies less integrated circuit (IC) chip areas. The demands to achieve these two design objects become even greater as the progress of the IC technology pushes the electronic circuits to become smaller in size while operating with ever higher speed. Since multiplication is one of the most basic operations most frequently performed in almost every data handling system such as the computers and digital signal processors, improvements made to the circuit design and algorithms used to perform multiplications are of significant importance to a wide varieties of applications where electronic processing techniques are employed.

Taking advantage of the very large scale integration (VLSI) techniques in making electronic devices on a single IC chip, highly systematic and modular configurations have been employed for the design of multiplication circuits with pipelined adder-rows wherein each row of adders are further divided into cells or blocks comprising many adders. The major consideration in carrying out either additions and multiplications by use of rows of pipelined adders is the techniques used in managing the carry from the least significant bits to the most significant bits.

Typically, there are three general categories of techniques in handling the carry propagations. The first technique is the 'add-shift technique' by which the carry propagation is based on the use of a ripple through process. The carry is propagated by 'rippling' from the less to the more significant bit. The circuit design for this type of multipliers is relative simple, however, it has the disadvantage that the computation is slow especially for multiplication of operands with larger number of bits. The second type is a 'carry-save' multiplier wherein every carry for each of a series of full adders is saved and receive into a next full adder for a next more significant bit. A flip-flop circuit is required for each full adder which increases significantly the overhead areas occupied by the multiplier and resulting in higher power consumption by the circuits even this type of multipliers have faster computational speed. The third type of multiplier is the 'carry-lookahead' multipliers wherein the carry-bit input of each adder is generated by taking into account the computation results of a plurality of preceding stages, e.g.., K stages. The carry-bit input to current stage, i.e., Ci of the i-th stage, is generated from the computational results of K-th preceding stages, i.e., (i+1)-th, (i+2)-th, ..., (i+K)-th stages, by considering two output signals, i.e., a carry generate signal $g_{i+m}$ and a carry propagate signal $p_{i+m}$, of each stage. Mathematically, it can be represented by an equation as:

$$Ci = \sum_{m=1}^{K} F(g_{i+m}, p_{i+m}) \quad (1)$$

Where F is a linear function of $g_{i+m}$ and $p_{i+m}$. This type of adders and multipliers does have the advantage that the speed of computation may be increased by looking ahead and anticipating the carry and then a selection is made when sufficient information is ready. Theoretically, this type of technique would be useful for adders and multipliers to process longer strings of binary operands. However, due to the circuit complexity, a multiplier of this type would be too complex for actual implementation, particularly, for a multiplier to carry out multiplications using multiple stages of pipelined adders.

Letteney et al. disclose in U.S. Pat. No. 4,228,520 entitled 'High Speed Multiplier Using Carry-Save/Propagate Pipeline with Sparse Carriers' (Issued on Oct. 14, 1980) discloses a multiplier with a configuration which enables the multiplication to be carried out by iteratively adding four multiples of a multiplicand in a stage of 4-2 carry save adders which then feed four-bit parallel adders each has four sum outputs and a carry output from the highest order bit position. Only the sum outputs are latched and then fed to a carry propagate adder on each iteration for addition to the previous partial products. Only the single carry output from each of the 4-bit parallel adders needs to be latched and then fed to another 4-bit parallel adder.

By the use of this multiplier configuration, Letteney et al. is able to reduce the latches and the input and output (I/O) pin requirements. This multiplier then generates only a single carry output from an 4-bit parallel adder. However, the multiplier as disclosed by Letteney et al. still has the problems that a single multiplication has to be partitioned into many iterations. And, for a multiplicand which consists of more than four multiples, each iteration processes only four multiples of a multiplicand. Even this multiplier discloses a configuration for reducing the number of latches for carry propagations, however, there are added circuit overhead in requiring one 4-bit parallel adder, one 4-bit carry propagation adder and one 4-bit register. Furthermore, the multiplier as disclosed by Letteney et al. may not suitable for higher speed operation due to the fact that it requires a carry propagation from a 4-2 carry save adder to the carry output of the 4-bit parallel adder which will cause each iteration to take up two clock cycles. This requirement will definitely reduce the usefulness of this multiplier to modern electronic systems and devices where high speed operation is required.

Cash et al. disclose in U.S. Pat. No. 4,887,233 entitled 'Pipeline Arithmetic Adder and Multiplier' a pipelined multiplier design which uses a plurality pipelined adder rows. The multiplier comprises a pipelined para-multiplication subsection, a pipelined adder subsection and a synchronization register subsection. The multiplication is performed by employing a plurality of one-bit registered half adders to realize the addition operations for each row wherein the number of the half adder stages in the first row is equal to the number of the bits in the incoming binary words to be added. In each successive row, one least significant bit registered half adder is replaced with a one bit register until no adder are left. The number of rows is equal to the number of half adders in the first row. In a modified embodiment, the adders are used to receive two carry inputs and develop two carry outputs to reduce the number of the adder cells to approximately half.

Even though the multiplier as disclosed in this patent has the advantages of reducing the ripple-through carry delays, however, it is still limited by the size and cost of this multiplier due to use of carry-save technique in its entire multiplier circuit which requires large number of added registers. Additionally, the carry delay may further cause the concerns of clock letencies which may unduly add to the complexity in design and fabrication of this multiplier.

Nathan discloses in U.S. Pat. No. 4,644,488 entitled "Pipeline Active Filter Utilizing A Booth Type Multiplier" (Issued on Feb. 17, 1987) a pipeline active filter which employs multiplier units of the modified Booth decoder and carry-save adder combination. Each multiply unit uses a modified Booth decoder and only one row of carry save adders and the results are transferred to less significant multiplier positions for addition in subsequent operations for multiplication of bits by weight. Each carry save adder accepts a sum signal and a carry signal from more significant bit multiplier positions without having to add the carry signal it receives to obtain the correct sum. This particular configuration and procedures of operation may be suitable for the specific application to the filter which accepts weighting factors in a time sequential manner. However, the structure of the multiplier as disclosed in this patent presents a particular problem for its application as a regular carry save multiplier. Specifically, the number of circuits and the size of the multiplier increase almost exponentially in a non-linear fashion either under the condition that the number of bits of to be processed by the multiplier is increased or when a higher speed for multiplication is required. Besides the limitations caused by large number of circuits and size, the multiplier as disclosed by Nathan further has additional difficulties in testing as the number of circuits becomes very large.

Wong et al. disclose in another U.S. Pat. No. 4,953,119 entitled Multiplier circuit with Selectively Interconnected Pipelined multipliers for Selectively multiplication of Fixed and Floating Point Numbers; (issued on Aug. 28, 1990) a multiplier which performs fixed point and floating point multiplications of a plurality of input words with predetermined word length. The multiplier has an input logic means to receive a plurality of input data words having predetermined data word length for providing first and second output words comprising least and most significant portions of the input data words. A multiplier unit is coupled to the input logic means which has a first and a selected selectively interconnected parallel pipelined multiplier paths configured to implement a modified Booth algorithm. The two multiplier paths process the least significant and the most significant words of the first and the second data word respectively. Various recorders and pipelined registers are then used interposing these multiplier paths to obtain the final products from the multiplication apparatus. The invention disclosed by Wong et al. may be suitable for implementation where multiplications of fix point data as well as floating point data are required in a special purpose processor, however, the multiplier as disclosed which comprises interleaved and parallel architectures with coupled recorders and registers is very complex and may become too expensive and inconvenient for general purpose applications.

Therefore, there is still a demand in the art of design and manufacture of multiplication apparatus which provide flexibility in design and configuration such that the structure of the multipliers can be flexibly adjusted and optimized depending on the speed requirement and the IC design constraints such as the IC chip area available and the power consumption limitations. The structure and operation of this multiplier should be systematic and modular such that the difficulties as encountered in the prior art may be overcome.

SUMMARY OF THE PRESENT INVENTION

It is therefore an object of the present invention to provide a circuit architecture for an apparatus to perform multiplication operations wherein the circuit elements can be flexibly and dynamically configured such that the architecture can be optimized for the speed and IC design requirements for each particular application.

Specifically, it is an object of the present invention to provide a circuit architecture for a pipelined multiplication apparatus which comprises both add-shift adder cells combined with carry-save circuits connecting these adder cells in a systematic modular way such that design, optimization, and fabrication can be conveniently carried out.

Another object of the present invention is to provide a pipelined multiplication apparatus which maximize the benefits of both the add-shift technique in saving the circuit areas and of the carry-save technique in computation speed to satisfy the requirements of a system specifications.

Another object of the present invention is to provide a pipelined multiplication apparatus which has a circuit architecture with systematic regularity such that it can be easily designed, modified, expanded, fabricated and tested.

Briefly, in a preferred embodiment, the present invention comprises a pipeline multiplier for multiplying a multiplicand to a multiplier. The multiplier includes a plurality of adder stages each stage includes a partial product processing means for processing a partial product of the multiplicand and L bits of the multiplier where L is an integer and L≧1. Each of the adder stages further includes a plurality of ripple carry adder (RCA) bands each band includes a plurality of full adders wherein the carry of the full adders ripple sequentially to the most significant full adder in the RCA band. The adder stages are further arranged in sequential order such that each of the RCA bands in each stage being pipelined to a corresponding RCA band, which is a RCA band being more-significantly-shifted by L bits, in next adder stage according to the sequential order whereby an accumulative partial product is propagated from one of the adder stages to a next stage. The full adders in each of the RCA band add the partial product from the partial product processing means to the accumulative partial product propagated from last adder stage according to the sequential order. Each of the adder stages further includes a band-carry processing means for each of the RCA band for processing the carry of the RCA band for the RCA bands in next adder stage according to the sequential order.

It is an advantage of the present invention that it provides a circuit architecture for an apparatus to perform multiplication operations wherein the circuit elements can be flexibly and dynamically configured such that the architecture can be optimized for the speed and IC design requirements for each particular application.

An advantage of the present invention is that it provides a circuit architecture for a pipelined multiplication apparatus which comprises both add-shift adder cells combined with carry-save circuits connecting these adder cells in a systematic modular way such that design, optimization, and fabrication can be conveniently carried out.

Another advantage of the present invention is that it provides a pipelined multiplication apparatus which maximize the benefits of both the add-shift technique in saving the circuit areas and of the carry-save technique in computation speed to satisfy the requirements of a system specifications.

Another advantage of the present invention is that it provides a pipelined multiplication apparatus which has a circuit architecture with systematic regularity such that it can be easily designed, modified, expanded, fabricated and tested.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
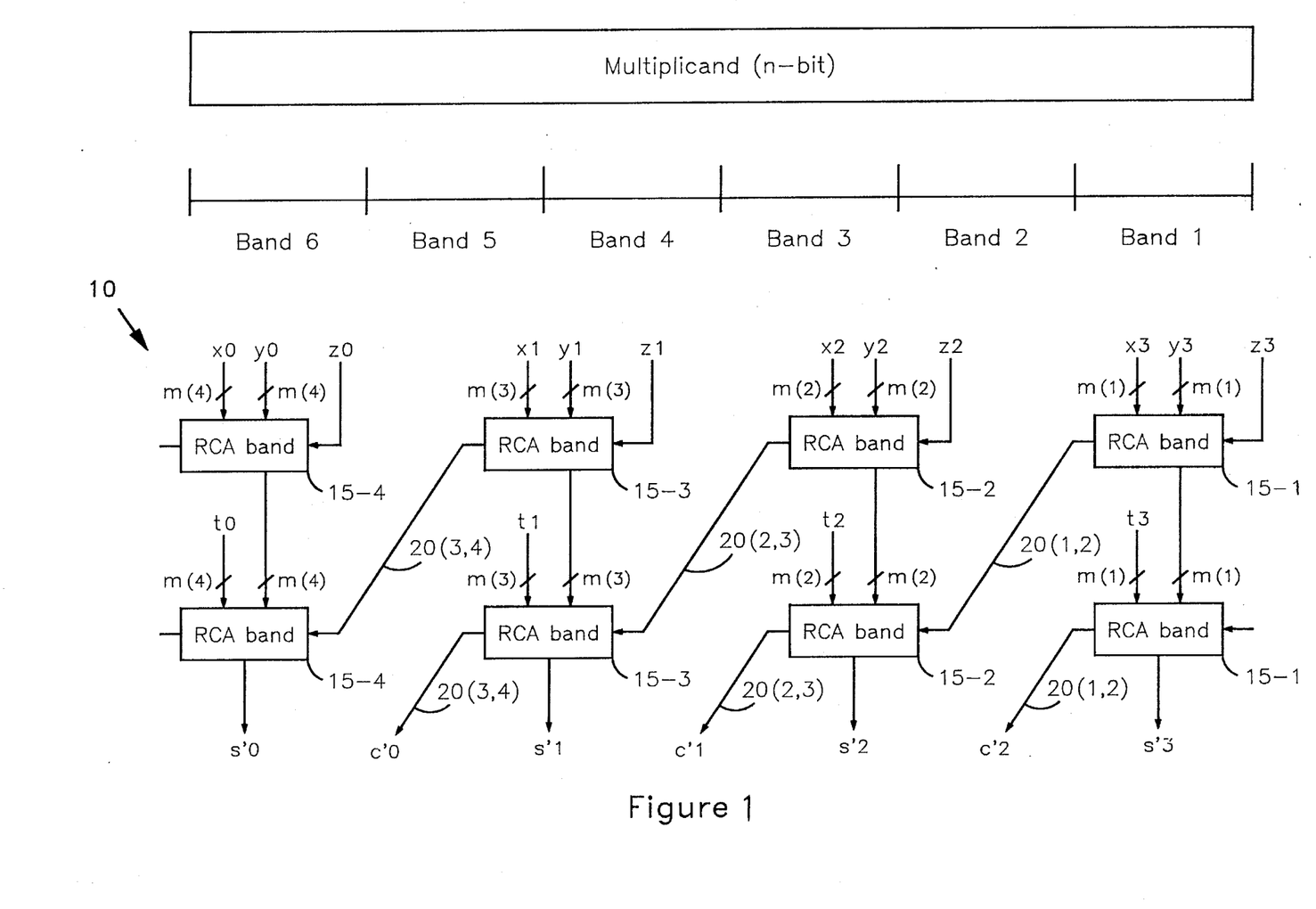
FIG. 1 is a schematic block diagram showing the circuit architecture of a pipeline multiplier of the present invention.

FIG. 1 shows the basic structural principle for a multiple stage pipeline multiplier 10 according to the present invention. The multistage pipeline multiplier 10 is used to process multiplication of multiplicands up to a maximum number of n-bits. The adders in each stage are grouped into several ripple carry adder (RCA) bands, i.e., RCA-1, RCA-2, RCA-3,...,RCA-L where L=4 as shown in FIG. 1. Each RCA band 15-j where j=1,2,3, ..., L processed the addition of m(j) bits such that:

$$\sum_{j=1}^{L} m(j) = n \quad (2)$$

Each of the RCA band 15-j performs the addition of two numbers of m(j) bits by using a ripple carry technique without carry save operation. At the end of a clock cycle, the final carry C (j) of an RCA band 15-j is inputted to a next more significant RCA band 15-(j+1) through a carry input line 20(j,j+1) to be used for the computation in that RCA band in the next clock cycle. The process is repeated in each stage until all the bits in the multiplicand are processed in obtaining the final result of the multiplication.

Figure 2:
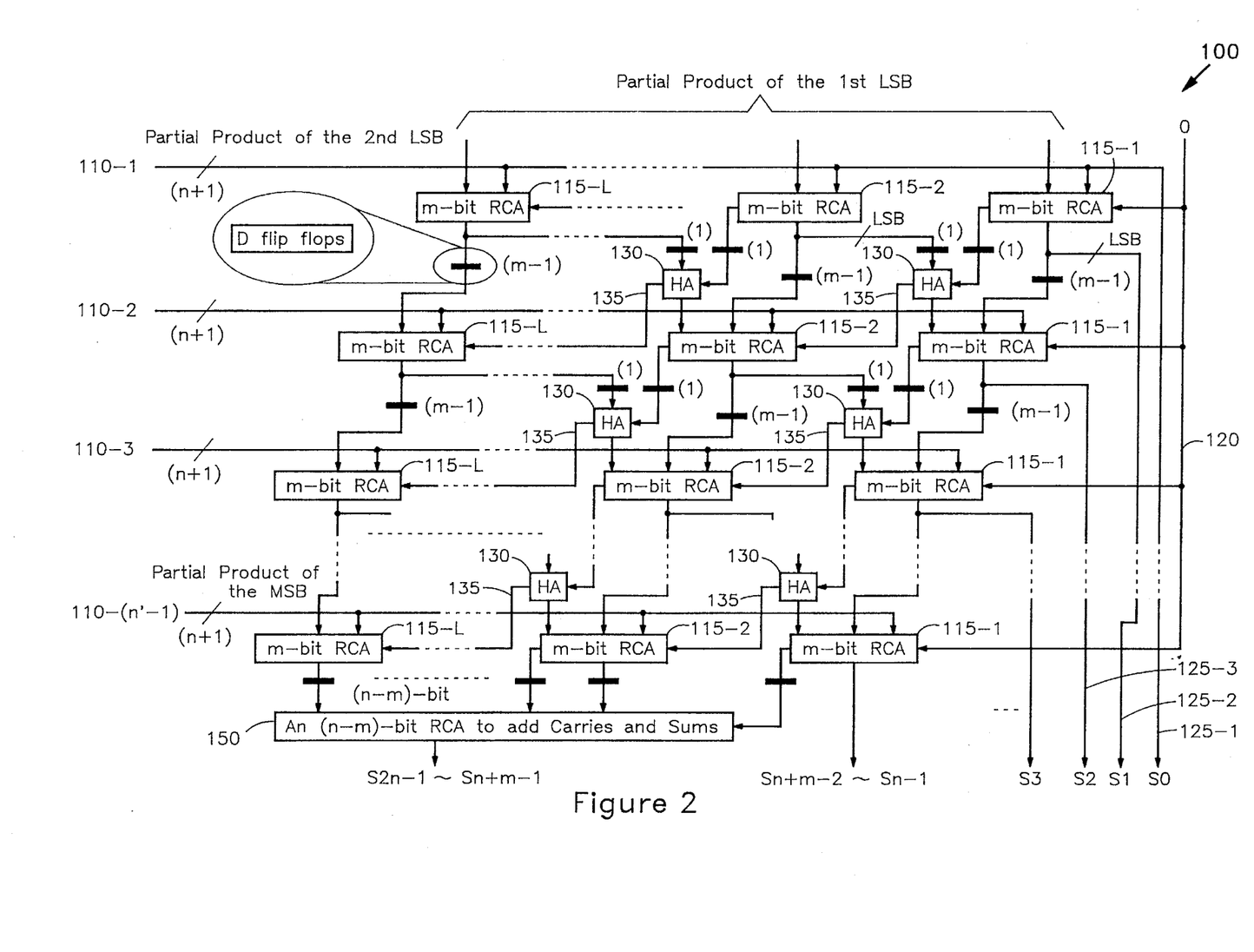
FIG. 2 is a circuit diagram of a pipeline multiplier including a plurality of ripple carry adder (RCA) bands.

FIG. 2 is a schematic block diagram showing the architecture of a pipeline multiplier 100 for multiplying a multiplicand of n bits, i.e., $X_1 X_2 X_3 \ldots X_n$ and a multiplier of n' bits, i.e., $Y_1 Y_2 Y_3 \ldots Y_n'$, by applying the basic structural principle set forth in FIG. 1. The multiplier 100 is a pipeline multiplier with a plurality of adder stages 110-i where i=1,2,3, . . . ,(n−1)'. The adders in each stage 110-i are grouped into several RCA band 115-j where j=1,2,3, . . . , L and each RCA band processes m(j) bits according to equation (2).

In each stage 110-i, the rightmost RCA band, i.e., RCA band 115-1 which processes the first m(1) least significant bits accepts a carry-in of the zero from a carry-in line 120 for the least significant bit which is typically bit-0 in most operations. Meanwhile, in each stage 110-i, each RCA band 115-j accepts a m(j)-bit input which is a partial product of the multiplicand, i.e., the corresponding m(j) bits of the multiplicand which is $X_r X_{r+1} X_{r+2} \ldots X_{r+m(j)-1}$, by the (i+1)th bit of the multiplier which is $Y_{i+1}$ where $$r = \sum_{k=1}^{j-1} m(k) - 1 \quad (3)$$

At the beginning, each RCA band 115-j in the first stage 110-1 also receives a m(j)-bit input which is a partial product of the multiplicand, i.e., the corresponding m(j) bits of the multiplicand which is $X_r X_{r+1} X_{r+2} \ldots X_{r+m(j)-1}$, by the least significant bit, i.e., bit-zero, of the multiplier which is $Y_0$. In each stage 110-i, a plurality of add shift type of operations are carried out in each RCA band 115-j by adding the accumulated sum passed from the last stage through a data bus of m(j)-1 bits wherein the least significant bit for that RCA band 115-j is transmitted through an output line 125-q as a final bit for the resultant multiplication, where q=1,2,3, . . . M and M is the product of n by m.

Figure 3:
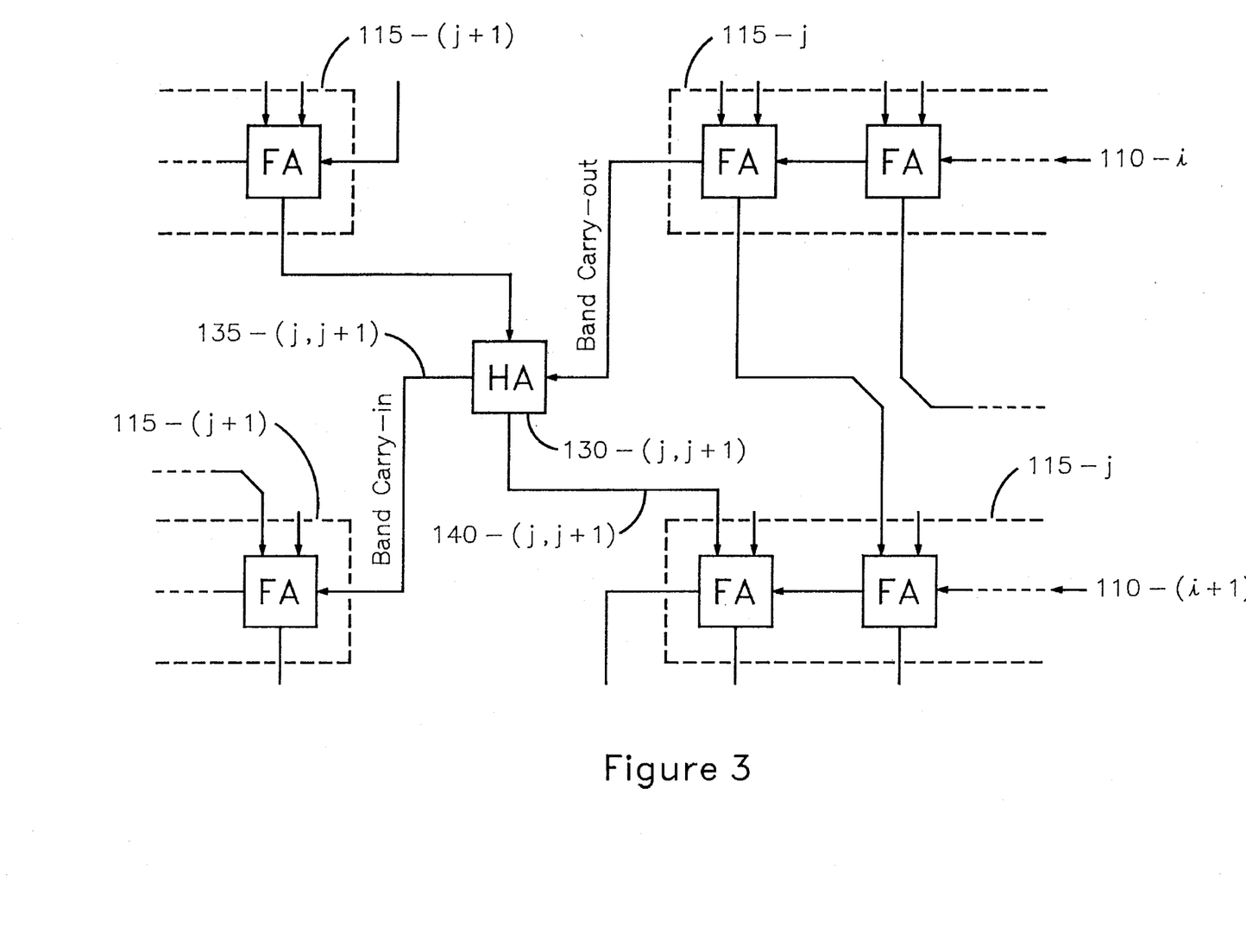
FIG. 3 is a circuit diagram showing the interconnections of the half adders utilized between the RCA bands of the multiplier of FIG. 2.

In order to process the carry between the RCA bands 115-j and 115-(j+1), a half adder 130-(j,j+1) is used to compute a carry 135-(j,j+1) by adding the carry from the most significant bit of the RCA band 115-j and the least significant bit of the RCA band 115-(j+1). Referring to FIG. 3 where the operations of the half adder 130-(j,j+1) is shown in more details. The computed carry 135-(j,j+1) is then inputted as the carry to the RCA band 115-(j+1) in the computation of sum for the next stage 110-(i+1). Meanwhile, since in the next stage 110-(i+1), every RCA band 115-j is shifted to the left by one bit, the least significant bit in the RCA band 115-(j+1) in stage 110-i becomes the most significant bit of the RCA band 115-j in stage 110-(i+1). For that reason, the sum computed by the half adder 130-(j,j+1) is to be inputted as the accumulated sum 140-(j,j+1) to a full adder 145-(i,j,$m_{ij}$) wherein the full adder 145-(i,j,$m_{ij}$) is employed in stage 110-(j+1) to process the most significant bit $m_{ij}$ of the RCA band 115-j in the next stage 110-(i+1). At the last stage, i.e., stage 110-(n'−1), the partial products of the most significant bit of the multiplier, i.e., $Y_n'$ are processed by the use of a plurality of RCA bands 115-j where j=1,2,3, . . . , n. A final ripple carry adder 150 is used to compute the final sum of the remaining R bits where $$R = \sum_{j=1}^{L-1} m(j) \quad (4)$$

to take into account of the sums and carrys computed by the all the RCA bands 115-1 to 115-L For the purpose of simplified the design and fabrication, one of the preferred embodiments is to make the number of full adders in each RCA band 115-j for j=1,2,3, . . . , (L-1) to be a constant number, i.e., $$m(j)=m \text{ for } j=,2,3, \ldots , (L\text{-}1) \quad (5)$$

and $$m(L) = n - \sum_{j=1}^{L-1} m(j) = n - [m(L-1)] \quad (6)$$

In that case, the last ripple carry adder 150 processes the sums and carrys for the last (n-m) bits to complete the multiplication operation.

The partial carry save adder structure employed in the pipeline multiplier 100 provides a very simple basic unit with regular structure such that it can be systematically and conveniently implemented on an integrated circuit (IC) chip. Additionally, it provides great flexibility for a circuit designer to adjust the speed of computation of this multiplier for different type of applications. If a high speed multiplier is required, the multiplication operation can be expedited by dividing the full adders in each stage 110-i into more RCA band 115-j, i.e., by increasing the total number L of RCA bands 115-j thus decreasing the number of full adders m(j), or m in a specific embodiment, in each RCA band 115-j. The delays caused by the ripple of carrys in each RCA band 115-j are reduced and the speed of computation is therefore increased. It should be noted that the increase of speed is obtained at a price of adding more half adders 130-(j,j+1) in each stage 110-i. Conversely, if the requirement of computational speed can be relaxed, the number of hardware devices and manufactured cost can be conveniently saved by reducing the total number L of the RCA band 115-j in each stage 110-i thus increasing the number of the full adders m(j) in each RCA band 115-j. The ripple delays in each RCA band 115-j will increase when the total number of full adders L increases. As a consequence it will cause the computation speed to slow down with the benefit that some cost savings can be achieved when the number of half adders is reduced.

The present invention thus discloses a pipeline multiplier 100 for multiplying a multiplicand to a multiplier which includes a plurality of adder stages 110-i each adder stage includes a partial product processing means (not shown) for processing a partial product of the multiplicand and one of the multiplier. Each of the adder stages 110-i further includes a plurality of ripple carry adder (RCA) bands 115-j each band includes a plurality of full adders wherein the carry of the full adders ripple sequentially to the most significant full adder in the RCA band. Furthermore, each of the RCA bands 115-j in each adder stage 110-i includes approximately same number of full adders. The adder stages 110-i are further arranged in sequential order such that each of the RCA bands in each stage are pipelined to a corresponding RCA band 115-j, which is a RCA band 115-j being more-significantly-shifted by one bit, in next adder stage according to the sequential order whereby an accumulative partial product is propagated from one of the adder stages 110-i to a next stage 110-(i+1). The full adders in each of the RCA band 115-j add the partial product from the partial product processing means to the accumulative partial product propagated from last adder stage 110-(i−1) according to the sequential order. Each of the adder stages 110-i further includes a band-carry processing means which is a half adder 130 for adding the carry from the RCA band 115-j to a bit of the partial product which is the least significant bit of a next more significant RCA band 115-(j+1) in the adder stage 110-i for propagating a processed band-carry to the corresponding RCA band 115-j in the next adder stage 110-(i+1) as the most significant bit of the partial product and to a more significant RCA band 115-(j+1) in the next adder stage 110-(i+1) as a carry-in.

The present invention thus provides a circuit architecture which is simple with built-in systematic regularity. Furthermore, it provides flexibility to a designer to simultaneously take advantage of (1) the simplicity of the ripple carry adders and (2) the speed of the carry save adder. The difficulties and limitations of the prior art are therefore overcome by the circuit architecture provided in the present invention.

Figures 4, 4A:
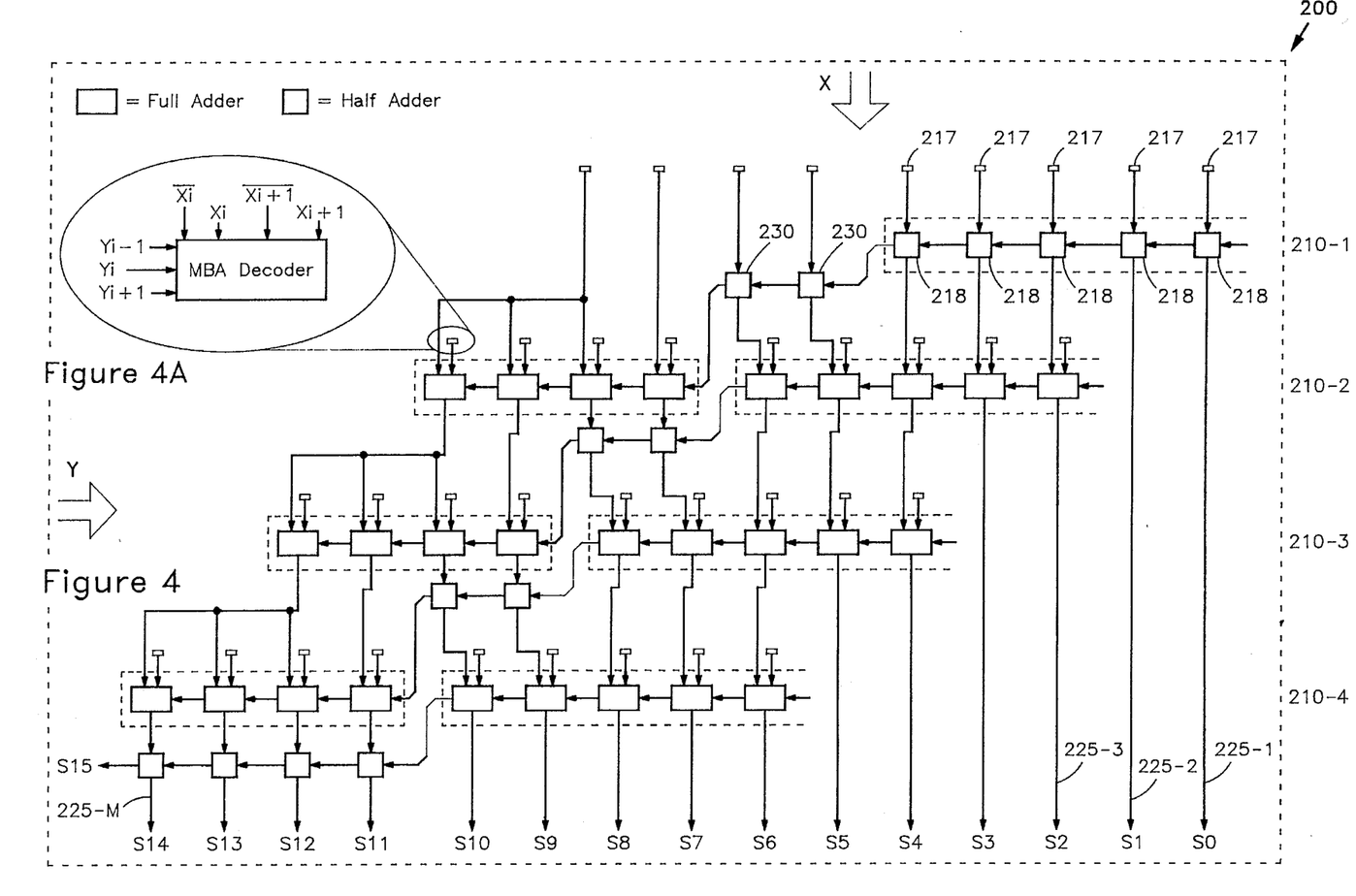
FIG. 4 is a circuit diagram of a pipeline multiplier including a plurality of ripple carry adder (RCA) bands and utilizing a plurality of modified Booth decoders.
FIG. 4A is a schematic block diagram showing the operation of a modified Booth decoder.

FIG. 4 shows another preferred embodiment of the present invention wherein the modified Booth adders are employed in a pipeline multiplier 200 to perform the multiplication of a multiplicand of n bits, i.e., $X_1X_2X_3 \ldots X_n$, and a multiplier of n' bits, i.e., $Y_1Y_2Y_3 \ldots Y_n'$, by employing the modified Booth multiplication (MBM) decoders and the basic structural principle set forth in FIG. 1. The multiplier 200 is a pipeline multiplier with a plurality of adder stages 210-i where i=1,2,3, . . . ,$n_b$ where:

$$n_b = (n'-1)/2 \quad (7A)$$

if (n'−1) is an even number; and $$n_b = n'/2 \quad (7B)$$

if n' is an even number. It should be noted that the number of stages is reduced by using of the modified Booth multiplication (MBM) decoders 217. The operation of the MBM decoder 217 is shown in FIG. 4A. Each MBA decoder 217 accepts two bits from the multiplicand, $X_i$ and $X_{i+1}$ and three bits from the multiplier, i.e., $Y_{1-1}, Y_1, Y_{1+1}$. An output $O_d$ is then generated as an input to each of the full adder 218 in each RCA band 215-j. The value of Od is a function of Xi, $X_{i+1}$, $Y_{1-1}$, $Y_1$, and $Y_{1+1}$ and can be summarized in a modified Booth table:

TABLE 1

| $Y_{1+1}$ | $Y_1$ | $Y_{1-1}$ | Od |
|---|---|---|---|
| 0 | 0 | 0 | 0 |
| 0 | 0 | 1 | Xi |
| 0 | 1 | 0 | Xi |
| 0 | 1 | 1 | $X_{i+1}$ |
| 1 | 0 | 0 | $X_{i+1}$ |
| 1 | 0 | 1 | Xi |
| 1 | 1 | 0 | Xi |
| 1 | 1 | 1 | 0 |

Accordingly, there can be five decoded values depending on the values of the three bits of the multiplier used in each MBM decoder 217. These function relationship of these five decoded values, i.e., 0,+1, +2, −2, −1, on the combination of the three bits, i.e., $Y_{1-1}, Y_1, Y_{1+1}$, are shown in Table 2 below. When the decode values from the three bits of the multipliers are either −2 or −1, the carry-in of an RCA band 215-j has to be added by one because it is a two's compliment. On the other hand, when the values are 0, +1, or +2, no such operation is required and the value of the carry-in of an RCA band 215-j is kept unchanged because it is now merely added by a value of zero.

TABLE 2

| $Y_{1+1}$ | $Y_1$ | $Y_{1-1}$ | Multiplicand multiples to be added |
|---|---|---|---|
| 0 | 0 | 0 | 0 X multiplicand |
| 0 | 0 | 1 | +1 X multiplicand |
| 0 | 1 | 0 | +1 X multiplicand |
| 0 | 1 | 1 | +2 X multiplicand |
| 1 | 0 | 0 | −2 X multiplicand |
| 1 | 0 | 1 | −1 X multiphcand |
| 1 | 1 | 0 | −1 X multiplicand |
| 1 | 1 | 1 | 0 X multiplicand |

The adders in each stage 210-i are grouped into several RCA bands 215-j where j=1,2,3, . . . , L and each RCA band processes m(j) bits according to equation (2). The entire pipeline multiplier 200 is structured in a plurality of stages 210-i and within each stage a plurality of full adders are divided into several RCA bands just like the basic architecture described above for the pipeline multiplier 100. The major difference between the multiplier 200 and the previous multiplier 100 is the use of the modified Booth multiplication (MBM) decoder 217. The processing steps for computing a product are basically similar 'to the steps carry out by the multiplier 100. Only those unique processing steps and associated functional blocks which are different from that of the multiplier 100 are further shown in FIG. 4 and described below.

In each stage 210-i, each RCA band 215-j accepts a m(j)-bit input which is a partial product of the multiplicand, i.e., the corresponding m(j) bits of the multiplicand which is $X_r X_{r+1} X_{r+2} \ldots X_{r+m(j)-1}$, multiplied by two bits $Y_{2i-1} Y_{2i-2}$ of the multiplier where r is defined by Equation (3) above. This m(j) bits partial product is obtained by employing the MBM decoder 217 which receives three bits each time from the multiplier $Y_1 Y_2 Y_3 \ldots Y_n'$ and two bits from the multiplicand $X_1 X_2 X_3 \ldots X_n$ to perform a decoding operation according to Table 1. Each full adder 218 in the RCA band 215-j thus processes two bits of the multiplicand and three bits of the multiplier. However, in accordance with the modified Booth algorithm, the most significant bit of the current set of bits either for the multiplicand or the multiplier becomes the least significant bit of the next more significant set of MBM decoder 217 and full adder 218. Therefore, in each RCA band 210-1, it is still required to have m(j) full adders 218 to process m(j) bits in the RCA band 210-j. Meanwhile, for the processing of the multiplier $Y_1 Y_2 Y_3 \ldots Y_n'$, there is a two-bit shift in progressing from one stage to a next stage.

At the beginning, since there is no previously decoded partial product to be added by the full adders, there is only one RCA band 215-1 which includes a plurality of half adders 218-1, in the first stage 210-1 to receive a m(j)-bit input which is a set of decoded partial product of the multiplicand, i.e., the corresponding m(j) bits of the multiplicand which is $X_r X_{r+1} X_{r+2} \ldots X_{r+m(j)-1}$ multiplied by the two least significant bits, i.e., bit-zero and bit one, of the multiplier which is $Y_0$ and $Y_1$. In each subsequent stages 210-i, a plurality of add shift type of operations are carried out in each RCA band 215-j by adding the accumulated sum passed from the last stage through a data bus of m(j)-1 bits wherein the two least significant bit for that RCA band 215-j is transmitted through an output line 225-q as a final bit for the resultant multiplication, where q=1,2,3, ... M and M is the product of n by m.

In order to process the carry between the RCA bands 215-j and 215-(j+1), two half adders 230-(j,j+1,1) and 230-(j,j+1,2) are used to compute a carry 235-(j,j+1,1) and 235-(j,j+1,2) by adding the carry from the two most significant bits of the RCA band 215-j and the least significant bit of the RCA band 215-(j+1).

The operations of the half adders 230-(j,j+1,1) and 230-(j,j+1,0) are basically similar to that shown in FIG. 3 except that there are two half adders 230-(j,j+1,1) and 230-(j,j+1,0) to process the carry from the RCA band 215-j. This is necessary because there is a two-bit shift between an adder stage 210-i and 210-(i+1). These two bits of the multiplicand are processed in combination with three bits of the multiplier by the modified Booth decoder 217 for inputting to these two half adders 230-(j,j+1,1) and 230-(j,j+1,0) to be added to the RCA band carry. The sum obtained by these two adders are then inputted to the two most significant bits of the RCA band 215-j in next stage as partial product and to the RCA band 215-(j+1) as a carry-in.

Similar to the multiplier 100, the multiplier 200 also need a final ripple carry adder 250 to compute the final sum of the remaining bits which are not yet processed by all the adder stages 210-i. Also, for the purpose of simplified the design and fabrication, one of the preferred embodiments is to make the number of full adders in each RCA band 215-j for j=1,2,3, ... , (L-1) to be a constant number and the number of the full adders 218 m(L) to be calculated as that provided in Equations (5) and (6).

A pipeline multiplier 200 for multiplying a multiplicand to a multiplier is thus disclosed which compres a plurality of adder stage 210-i each includes a partial product processing means for processing a partial product of the multiplicand and two bits of the multiplier. Each of the adder stage 210-i further includes a plurality of ripple carry adder (RCA) bands 215-j each including a plurality of full adders 218 wherein the carry of the full adders 218 ripple sequentially to the most significant full adders 218 in the RCA band 215-j. The adder stage 210-i are further arranged in sequential order such that each of the RCA band 215-j in each stage being pipeline to a corresponding RCA band 215-j, which being a RCA band 215-j are more-significantly-shifted by two bits, in next adder stage 210-i according to the sequential order whereby an accumulative partial product being propagated from one of the adder stage 210-i to a next stage. Each of the partial product processing means further includes a modified Booth decoding means 217 for each of the full adders 218 wherein each of the modified Booth decoding means 217 processes two bits from the multiplicand and three bits from the multiplier for generating a decoded partial product for the full adders 218. The full adders 218 in each of the RCA band 215-j adds the partial product from the partial product processing means, i.e., the modified Booth decoding means 217 to the accumulative partial product propagated from last adder stage 210-(i-1) according to the sequential order. Each of the adder stage 210-i further includes a band-carry processing means for each of the RCA band 215-j for processing the carry of the RCA band 215-j for the RCA band 215-j in next adder stage 210-(i+1) according to the sequential order wherein each of the band-carry processing means includes two half adders 230-(j,j+1,1) and 230-(j,j+1,0) for adding the carry from the RCA band 215-j to two bits of the decoded partial product for the least two significant bits of a next more significant RCA band 215-(j+1) in the adder stage 210-i for propagating a processed band-carry to the corresponding RCA band 215j in the next adder stage 210-(i+1) as two most significant bits of the partial product and to a more significant RCA band 215-(j+1) in the next adder stage 210-(i+1) as a carry-in whereby each of the adder stage 210-i processes two bits of the multiplier.

Therefore, the number of stages in the multiplier 200 is reduced with the aid of the modified Booth adder 217. The speed of the multiplication may also be increased with the reduction of the pipeline stages. Again, additional flexibility is provided through the use of the basic structure units, i.e., the RCA band 215-j in each stage and the use of MBA decoder 217, a designer has various options to design the pipeline multiplier 200 with optimal hardware components to satisfy wide range of speed and other associated IC design, fabrication and testing requirements.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A pipeline multiplier for multiplying a multiplicand to a multiplier comprising:

a plurality of adder stages each including a partial product processing means for processing a partial product of said multiplicand and L bits of said multiplier where L being an integer and L≧1;

each of said adder stages further including a plurality of ripple carry adder (RCA) bands each including a plurality of full adders wherein the carry of said full adders rippling sequentially to the most significant full adder in said RCA band;

said adder stages being further arranged in sequential order such that each of said RCA bands in each stage being pipelined to a corresponding RCA band, which being a RCA band being more-significantly-shifted by L bits, in next adder stage according to said sequential order whereby an accumulative partial product being propagated from one of said adder stages to a next stage;

said full adders in each of said RCA bands in said next stage adding said partial product from said partial product processing means to said accumulative partial product propagated from last adder stage according to said sequential order;

each of said adder stages further including a band-carry processing means for each of said RCA bands for processing the carry of each of said RCA bands to a next-more significant RCA band in next adder stage according to said sequential order; and the number of said plurality of full adders in each of said RCA bands being flexibly adjustable for satisfying a computational speed requirement of said pipeline multiplier.

2. The pipeline multiplier of claim 1 wherein:

each of said partial product processing means further includes a modified Booth decoding means for each of said full adders and said band-carry processing means wherein each of said modified Booth decoding means processes two bits from said multiplicand and three bits from said multiplier for generating a decoded partial product for each of said full adders and said band-carry processing means whereby each of said adder stages processes two bits of said multiplier.

3. The pipeline multiplier of claim 2 wherein:

each of said band-carry processing means includes two half adders for adding the carry from each of said RCA bands to two bits of said decoded partial product for the least two significant bits of a next more significant RCA band in said adder stage for propagating a processed band-carry to said corresponding RCA band in said next adder stage as two most significant bits of said partial product and to a more significant RCA band in said next adder stage as a carry-in.

4. A pipeline multiplier for multiplying a multiplicand to a multiplier comprising:

a plurality of adder stages each including a partial product processing means for processing a partial product of said multiplicand to L bits of said multiplier where L being an integer and L being one;

each of said adder stages further including a plurality of ripple carry adder (RCA) bands each including a plurality of full adders wherein the carry of said full adders rippling sequentially to the most significant full adder in said RCA band;

said adder stages being further arranged in sequential order such that each of said RCA bands in each stage being pipelined to a corresponding RCA band, which being a RCA band being more-significantly-shifted by L bits, in next adder stage according to said sequential order whereby an accumulative partial product being propagated from one of said adder stages to a next stage;

said full adders in each of said RCA bands in said next stage adding said partial product from said partial product processing means to said accumulative partial product propagated from last adder stage according to said sequential order; and each of said adder stages further including a band-carry processing means for each of said RCA bands wherein said band-carry processing means being a half adder for adding the carry from each of said RCA bands to a bit of said partial product which is the least significant bit of a next more significant RCA band in said adder stage for propagating a processed band-carry to said corresponding RCA band in said next adder stage as the most significant bit of said partial product and to a more significant RCA band in said next adder stage as a carry-in.

5. The pipeline multiplier of claim 4 wherein:

each of said RCA bands in each adder stage includes approximately same number of full adders.

6. A pipeline multiplier for multiplying a multiplicand to a multiplier comprising:

a plurality of adder stages each including a partial product processing means for processing a partial product of said multiplicand and one bit of said multiplier;

each of said adder stages further including a plurality of ripple carry adder (RCA) bands each including a plurality of full adders wherein the carry of said full adders rippling sequentially to the most significant full adder in said RCA band, and wherein each of said RCA bands in each adder stage includes approximately same number of full adders;

said adder stages being further arranged in sequential order such that each of said RCA bands in each stage being pipelined to a corresponding RCA band, which being a RCA band being more-significantly-shifted by one bit, in next adder stage according to said sequential order whereby an accumulative partial product being propagated from one of said adder stages to a next stage;

said full adders in each of said RCA bands in said next stage adding said partial product from said partial product processing means to said accumulative partial product propagated from last adder stage according to said sequential order; and each of said adder stages further including a band-carry processing means which being a half adder for adding the carry from each of said RCA bands to a bit of said partial product which is the least significant bit of a next more significant RCA band in said adder stage for propagating a processed band-carry to said corresponding RCA band in said next adder stage as the most significant bit of said partial product and to a more significant RCA band in said next adder stage as a carry-in.

7. A pipeline multiplier for multiplying a multiplicand to a multiplier comprising:

a plurality of adder stages each including a partial product processing means for processing a partial product of said multiplicand and two bits of said multiplier;

each of said adder stages further including a plurality of ripple carry adder (RCA) bands each including a plurality of full adders wherein the carry of said full adders rippling sequentially to the most significant full adder in said RCA band;

said adder stages being further arranged in sequential order such that each of said RCA bands in each stage being pipelined to a corresponding RCA band, which being a RCA band being more-significantly-shifted by two bits, in next adder stage according to said sequential order whereby an accumulative partial product being propagated from one of said adder stages to a next stage;

each of said partial product processing means further includes a modified Booth decoding means for each of said full adders and said band-carry processing means wherein each of said modified Booth decoding means processes two bits from said multiplicand and three bits from said multiplier for generating a decoded partial product for each of said full adders;

said full adders in each of said RCA bands in said next stage adding said partial product from said partial product processing means to said accumulative partial product propagated from last adder stage according to said sequential order; and each of said adder stages further including a band-carry processing means for each of said RCA bands for processing the carry of each of said RCA bands to a next-more significant RCA band in next adder stage according to said sequential order wherein each of said band-carry processing means includes two half adders for adding the carry from said RCA band to two bits of said decoded partial product for the least two significant bits of a next more significant RCA band in said adder stage for propagating a processed band-carry to said corresponding RCA band in said next adder stage as two most significant bits of said partial product and to a more significant RCA band in said next adder stage as a carry-in whereby each of said adder stages processes two bits of said multiplier.

* * * * *